United States Patent [19]

Summers

[11] 4,110,062
[45] Aug. 29, 1978

[54] PROCESSING EXTRUDED VINYL SIDING

[75] Inventor: James William Summers, Bay Village, Ohio

[73] Assignee: The B. F. Goodrich Company, Akron, Ohio

[21] Appl. No.: 757,702

[22] Filed: Jan. 7, 1977

[51] Int. Cl.² ............................................. B29C 25/00
[52] U.S. Cl. ................................. 425/71; 264/178 R; 425/445; 425/325; 425/404
[58] Field of Search ................... 264/178 R, 346, 347, 264/348; 425/68, 70, 71, 404, 445, 67, 69, 379 R, 378 R, 377, 325

[56] References Cited

U.S. PATENT DOCUMENTS

| | | | |
|---|---|---|---|
| 2,661,499 | 12/1953 | James et al. | 425/71 X |
| 3,039,142 | 6/1962 | Zavasnik | 425/71 X |
| 3,315,308 | 4/1967 | Wiley et al. | 425/71 X |
| 3,538,210 | 11/1970 | Gatto | 425/71 X |
| 4,029,452 | 6/1977 | Schippers et al. | 425/71 |

Primary Examiner—Francis S. Husar
Assistant Examiner—Mark Rosenbaum
Attorney, Agent, or Firm—Joseph Januszkiewicz

[57] ABSTRACT

Method and apparatus for processing extruded thermoplastic material for use in siding by advancing the extrudate from the die member through a series of baths which size and shape the extrudate. The process sizes and cools the extrudate, and, thence, heat treats the extrudate followed by a final quenching of the extrudate in its final shape and size.

1 Claim, 5 Drawing Figures

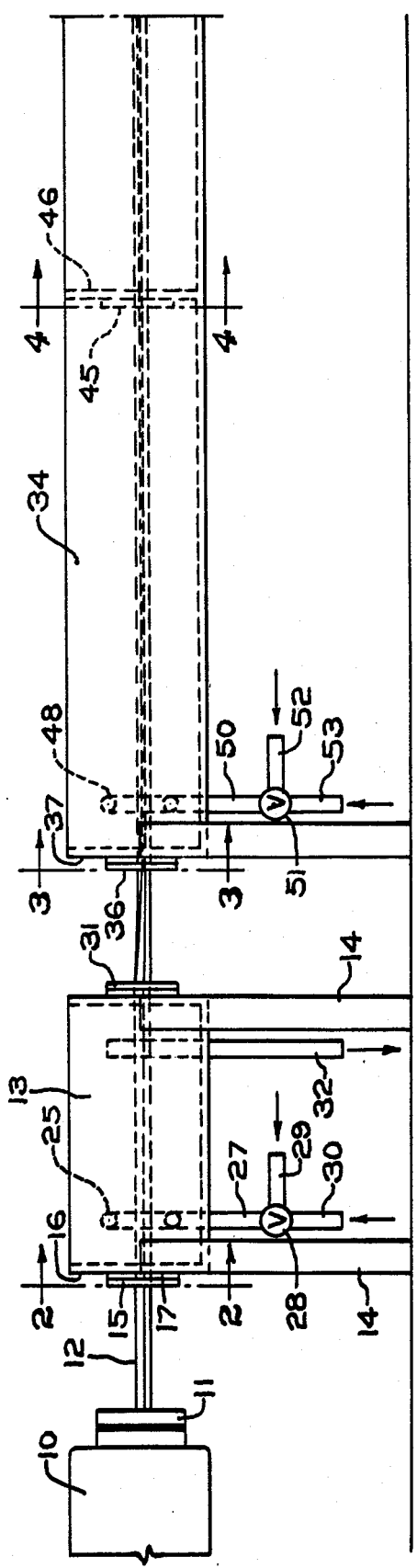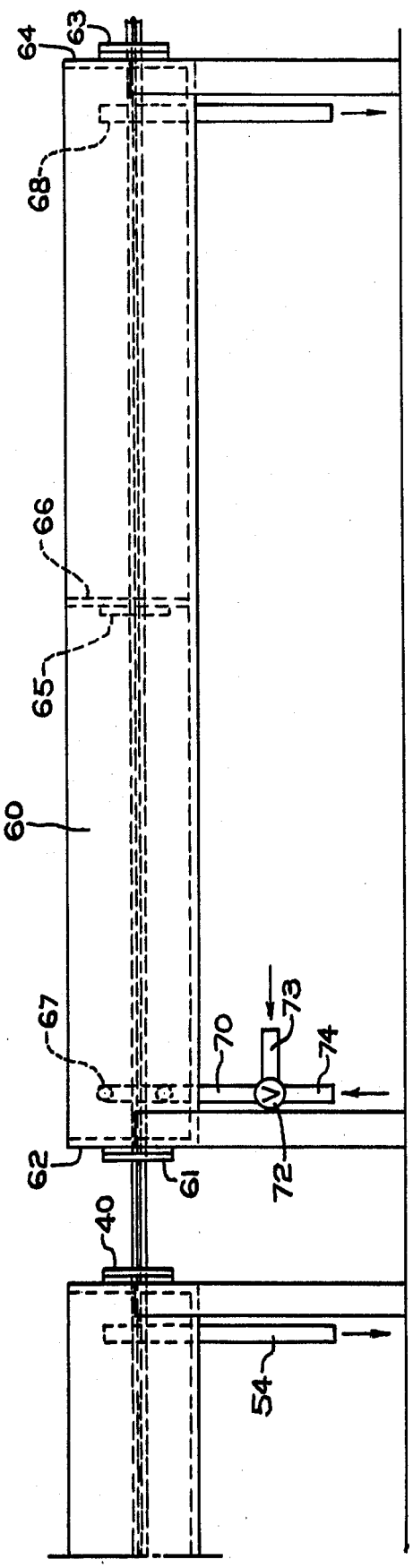

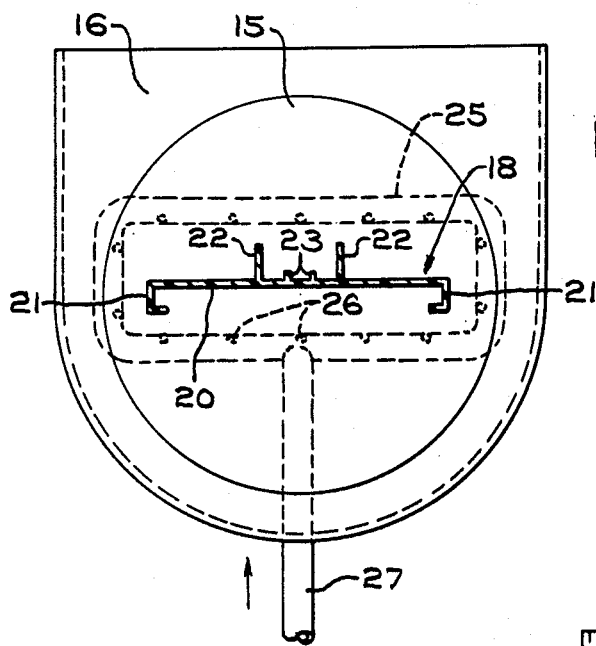
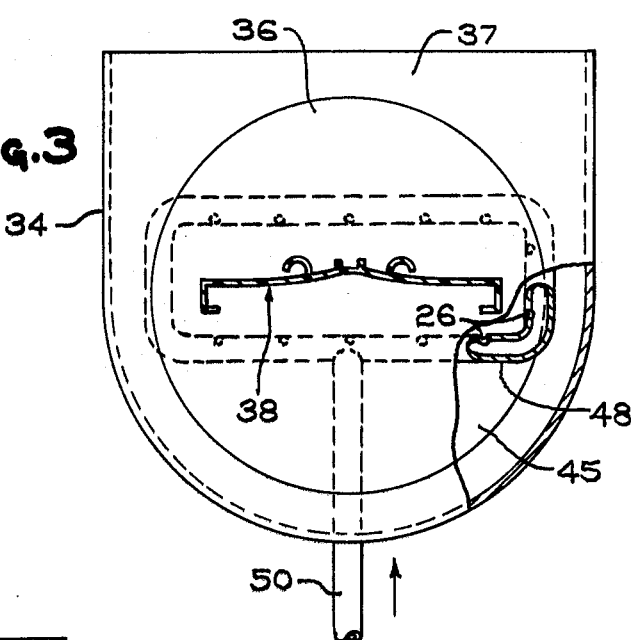
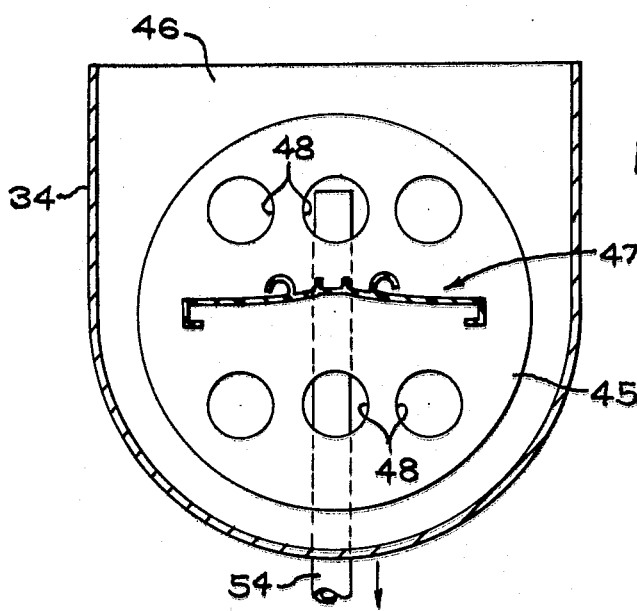

PROCESSING EXTRUDED VINYL SIDING

BACKGROUND OF THE INVENTION

This invention relates to an extrusion and sizing process and more particularly to a new and improved method and apparatus for extruding and sizing thermoplastic materials.

In the extrusion process of thermoplastic materials, reliance is made on the die means for shaping the product from the extruder. In certain instances the use of plastics for certain products has been hampered by the high temperatures necessary to economical manufacture of such products. One field that has some limitations is the vinyl house siding market. Herein to process a compound that has good color retention other than white and pastels along with high impact resistance as well as good impact retention upon weathering, it is necessary to extrude the compound at a high enough temperature to take advantage of the excellent toughening effect of rubber impact modifiers which work best at temperatures above 380° F. Processing siding at these temperatures is extremely difficult because the extrudate is too soft to handle and size properly. Accordingly, manufacturers producing the vinyl siding have limited their manufacturing to the fabrication of vinyl siding at a lower temperature range such as 350° F. to 360° F. to obtain a melt that is stiffer and more easy to size and handle. The present invention provides means and a process which permits extruding vinyl siding at high temperature such as above 380° F. to permit the use of the excellent properties in weathering capstocks presently available to get excellent toughness.

SUMMARY OF THE INVENTION

The present invention contemplates an apparatus and method which mounts a plurality of tanks downstream from an extruder having a first tank for sizing and cooling the extrudate to determine its shape and permit handling and thence means for relieving the stresses within the article so extruded, followed by provisions for setting the final shape and size of the extrudate.

BRIEF DESCRIPTION OF THE DRAWINGS

FIGS. 1a and 1b are longitudinal side elevational schematic views of the extruder apparatus constructed in accordance with the principles of this invention which when longitudinally aligned show the entire apparatus for processing the extruded stock.

FIG. 2 is a front elevational view taken on the line 2—2 of FIG. 1 of a cooling tank showing the sizing die in full and a spray head in phantom lines.

FIG. 3 is a front elevational taken along a line 3—3 of FIG. 1 of the heat treating tank showing the sizing die in full.

FIG. 4 is a front elevational view taken on a line 4—4 fo FIG. 1 of a support die located in the center portion of the heat treating tank.

DETAILED DESCRIPTION

Referring to the drawings wherein like reference characters designate like or corresponding parts throughout the several views, there is shown in FIG. 1 a plasticizing and extrusion means 10 having a die 11 at the forward portion thereof showing an extrudate 12 issuing therefrom. The die member 11 has a die opening that is contoured to the shape of the article desired which in the examples shown is that of two house siding sheets placed back to back similar to the configuration shown in FIG. 2. The completed shaping, sizing and heat treating of the extruded article is accomplished by the passage of the extruded article through a series of tanks to be described.

A tank illustrated generally as 13 is located directly in line with the extruder 10 supported by support legs 14. A circular shaped sizing plate or fixture 15 is suitably mounted on the forward end portion 16 of the tank 13 along with a circular gasket 17 (FIG. 1a) interposed between tank end portion 16 and the sizing fixture 15. The gasket 17 is provided to prevent the loss of fluid from the tank 13 in a manner old and well known in the art. The center portion of the sizing fixture 15 has an aperture 18 contoured substantially to the shape of the article desired, having an elongated portion 20, L-shaped portions 21 on the respective ends, and vertically extending portions 22 and 23 on the intermediate portion thereof. A rectangular shaped ring 25 with a passageway extending centrally therethrough has a plurality of openings 26 on the inner periphery to provide a means for spraying a liquid coolant onto the extrudate 12 that is passing through the tank 13. A conduit 27 is connected to the hollow passageway in the ring 25 to supply a coolant whose temperature is controlled by a mixing valve 28 receiving steam from conduit 29 and cold water from a conduit 30. Suitable exit means 31 similar to the sizing fixture 15 is provided in the other end wall of tank 13. An overflow pipe 32 is located in tank 13 such as to permit the substantial filling of the tank 13 with cooling fluid and to allow for the continuous flow to maintain the preselected temperature as set by mixing valve 28.

The extrudate passes from tank 13 to an elongated annealing tank 34, which tank 34 is similar in construction to tank 13. Tank 34 has a circular shaped sizing plate or fixture 36 suitably mounted on the forward end portion 37. Fixture 36 has a centrally disposed aperture 38 whose contour is substantially similar to aperture 18 in fixture 15 except that the vertically disposed portion is curved to facilitate the connection of one siding panel to another. The contour of the apertures 18 and 38 may be made to the shape desired. Tank 34 has an exit fixture 40, which also has a contoured aperture. The intermediate portion of tank 34 has a sizing support fixture 45 mounted on a center support 46. Fixture 45 has a centrally disposed contoured aperture 47 a plurality of circular apertures or bores 48 to facilitate the flow of water through the tank. Tank 34 has a rectangular shaped ring 48 similar to ring 25 in tank 13 with a passageway extending centrally therethrough and a plurality of openings on the inner periphery to provide a means for introducing a controlled temperature flow of water or heating fluid onto the extrudate that is passing through tank 34. A conduit 50 is connected to the hollow passageway in ring 48 to supply a fluid whose temperature is controlled by a mixing valve 51 receiving steam from conduit 52 and cold water from a conduit 53. An overflow pipe 54 is located in the end portion of tank 34 opposite to the rectangular shaped ring 48 to allow the heating fluid to flow in a continuous stream through tank 34 to maintain the preselected temperature as set by mixing valve 51.

The extrudate then passes from tank 34 to an elongated tank 60, which tank 60 is similar in construction to tank 13 and 34. Tank 60 has a circular shaped sizing plate or fixture 61 suitably mounted on the forward end portion 62 and a circular shaped sizing plate or fixture 63 on the rear end portion 64, with each fixture 61 and 63 being centrally recessed to allow the passage through of the extrudate 12. As discussed above each aperture of each fixture 61 and 63 is contoured to the final shape desired of the extrudate. The intermediate portion of tank 60 has a sizing support fixture 65 mounted on a center support 66, which fixture 65 has a central aperture and a plurality of bores as in the central fixture 45 of tank 34 to facilitate the uninterrupted flow of water or cooling fluid from a rectangular shaped ring 67 located in the front end portion of the tank to an overflow conduit 68 located at the rear end portion of the tank. Ring 67 has a passageway extending centrally therethrough and a plurality of openings on the inner periphery thereof. A conduit 70 is connected to the hollow passageway in ring 67 to supply the quenching fluid for the extrudate and tank 60. The temperature of the water or cooling fluid to tank 60 and conduit 70 is controlled by a mixing valve 72 receiving steam from conduit 73 and cold water from a conduit 74. The overflow pipe 68 maintains the water at a predetermined level to assure that the extrudate is fully covered as it passes through tank 60 and thereby maintains a predetermined temperature level of the extrudate.

In the operation of the described invention, the extruded plastic article 12 is formed by the die 11 of the extruder 10 and is directed into cooling tank 13 via aperature 18. As the extrudate passes through the cooling tank 13 the temperature of the extrudate is reduced sufficiently to prevent its rapid sagging and stretching. This action makes it easier to maintain the shape and size of the extrudate. As an example of the type of cooling effected, an extrudate entering the cooling tank 13 at about 410° F. is reduced to a temperature of approximately 200° F. by a water bath whose temperature is approximately 100° F. The extrudate then passes from tank 13 to a heating or annealing tank 34 wherein the water temperature is kept at about 205° F. such as to maintain the extrudate at about 205° F. as it passes through the heating tank 34. The extrudate is accurately sized by passage into and out of tank 34 while simultaneously removing the stresses that are in the extrudate. By passing the extrudate through annealing tank 34, the stresses are allowed to be relieved so that the finished product will not shrink or change shape under the influence of its own internal stresses. The extrudate is then directed into tank 60 where the bath temperature is maintained in the example chosen as 80° F. to quench the extrudate in such cooling tank 60. By use of the quenching bath of tank 60, the final size and shape of the extrudate is set so it will not further change in size or shape. The final shaped extrudate 12 exits from tank 60 free of stresses. By the described method and apparatus, the vinyl siding so produced has greater weathering properties since the extrudate can be processed at high temperature yet relieved of the internal stresses.

I claim:

1. An apparatus for manufacturing thermoplastic house siding comprising an extruder for extruding an elongated cross-sectioned house siding panel with L-shaped end portions, a cooling tank mounted adjacent to said extruder, said cooling tank having a forward end and a rear end portion, a sizing die located at said forward end portion and said rear end portion of said cooling tank, and annealing tank, said annealing tank having a forward portion and a rearward portion, said forward portion of said annealing tank mounted closely adjacent to said rear end portion of said cooling tank, a sizing die mounted in said forward portion of said annealing tank, a sizing die mounted in said rear end portion of said annealing tank, a sizing die mounted in the intermediate portion of said annealing tank, a quenching tank, said quenching tank having a forward portion and a rear end portion, said forward portion of said quenching tank mounted adjacent to said rear end portion of said annealing tank, a sizing die mounted in said forward portion of said quenching tank, a sizing die mounted in said rear end portion of said quenching tank, means connected to each of said tanks for controlling the flow of fluids into and out of said tanks, temperature control means connected to said cooling tank to maintain the temperature range therein to between 50° F. and 212° F., and temperature control means connected to said annealing tank to maintain the temperature therein from 160° F. to 212° F.

* * * * *